US010260237B2

(12) United States Patent
Hubbard et al.

(10) Patent No.: US 10,260,237 B2
(45) Date of Patent: Apr. 16, 2019

(54) ADHERED THERMOPLASTIC MEMBRANE ROOFING SYSTEM

(71) Applicant: FIRESTONE BUILDING PRODUCTS CO., LLC, Indianapolis, IN (US)

(72) Inventors: Michael John Hubbard, Anderson, IN (US); Hao Wang, Carmel, IN (US); Jiansheng Tang, Westfield, IN (US); Donna Tippmann, Fishers, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 170 days.

(21) Appl. No.: 15/103,497

(22) PCT Filed: Dec. 12, 2014

(86) PCT No.: PCT/US2014/069912
§ 371 (c)(1),
(2) Date: Jun. 10, 2016

(87) PCT Pub. No.: WO2015/089359
PCT Pub. Date: Jun. 18, 2015

(65) Prior Publication Data
US 2016/0312471 A1 Oct. 27, 2016

Related U.S. Application Data

(60) Provisional application No. 61/915,169, filed on Dec. 12, 2013.

(51) Int. Cl.
| | | |
|---|---|---|
| B32B 5/00 | (2006.01) |
| E04D 5/14 | (2006.01) |
| B32B 5/02 | (2006.01) |
| B32B 5/24 | (2006.01) |
| B32B 7/00 | (2019.01) |
| B32B 7/04 | (2019.01) |
| B32B 7/10 | (2006.01) |
| B32B 7/12 | (2006.01) |
| B32B 11/00 | (2006.01) |
| B32B 11/04 | (2006.01) |
| B32B 21/00 | (2006.01) |
| B32B 21/02 | (2006.01) |
| B32B 21/04 | (2006.01) |
| B32B 21/08 | (2006.01) |
| B32B 27/00 | (2006.01) |
| B32B 27/06 | (2006.01) |
| B32B 27/08 | (2006.01) |
| B32B 27/18 | (2006.01) |
| B32B 27/26 | (2006.01) |
| B32B 27/28 | (2006.01) |
| B32B 27/32 | (2006.01) |
| E04D 11/02 | (2006.01) |
| B32B 27/12 | (2006.01) |
| B32B 37/12 | (2006.01) |
| E04D 5/06 | (2006.01) |
| E04D 5/08 | (2006.01) |
| E04D 5/10 | (2006.01) |
| B32B 27/20 | (2006.01) |
| B32B 27/30 | (2006.01) |
| B32B 27/36 | (2006.01) |

(52) U.S. Cl.
CPC .............. *E04D 5/148* (2013.01); *B32B 5/00* (2013.01); *B32B 5/02* (2013.01); *B32B 5/028* (2013.01); *B32B 5/24* (2013.01); *B32B 7/00* (2013.01); *B32B 7/04* (2013.01); *B32B 7/10* (2013.01); *B32B 7/12* (2013.01); *B32B 11/00* (2013.01); *B32B 11/046* (2013.01); *B32B 21/00* (2013.01); *B32B 21/02* (2013.01); *B32B 21/04* (2013.01); *B32B 21/08* (2013.01); *B32B 27/00* (2013.01); *B32B 27/06* (2013.01); *B32B 27/08* (2013.01); *B32B 27/12* (2013.01); *B32B 27/18* (2013.01); *B32B 27/20* (2013.01); *B32B 27/26* (2013.01); *B32B 27/28* (2013.01); *B32B 27/283* (2013.01); *B32B 27/302* (2013.01); *B32B 27/308* (2013.01); *B32B 27/32* (2013.01); *B32B 27/327* (2013.01); *B32B 27/36* (2013.01); *B32B 37/12* (2013.01); *E04D 5/06* (2013.01); *E04D 5/08* (2013.01); *E04D 5/10* (2013.01); *E04D 11/02* (2013.01); *B32B 2250/02* (2013.01); *B32B 2250/03* (2013.01); *B32B 2250/04* (2013.01); *B32B 2250/05* (2013.01); *B32B 2270/00* (2013.01); *B32B 2307/3065* (2013.01); *B32B 2323/10* (2013.01); *B32B 2419/06* (2013.01)

(58) Field of Classification Search
None
See application file for complete search history.

(56) References Cited

U.S. PATENT DOCUMENTS

| 7,749,924 B2* | 7/2010 | Peng | ................. B32B 27/32 442/38 |
|---|---|---|---|
| 2003/0145546 A1* | 8/2003 | Georgeau | ............... E04D 5/12 52/408 |

(Continued)

FOREIGN PATENT DOCUMENTS

| EP | 1 544 254 A1 | 6/2005 |
|---|---|---|
| JP | 2004202739 A | 7/2004 |

(Continued)

OTHER PUBLICATIONS

International Search Report for Appl. No. PCT/US2014/069912 dated Feb. 27, 2015, p. 1-4.

(Continued)

*Primary Examiner* — Ana L. Woodward
(74) *Attorney, Agent, or Firm* — Brian D. McAlhaney; Arthur M. Reginelli

(57) ABSTRACT

An adhered roofing system comprising a roof substrate, a thermoplastic membrane including at least one layer that includes a functionalized thermoplastic polymer, and an adhesive securing the membrane to the substrate, where the adhesive includes a cured residue of a polymer having a silicon-containing hydrolyzable terminal group.

22 Claims, 2 Drawing Sheets

(56) References Cited

U.S. PATENT DOCUMENTS

| | | |
|---|---|---|
| 2003/0219564 A1 | 11/2003 | Hubbard |
| 2004/0214950 A1 | 10/2004 | Nakamura |
| 2005/0048236 A1 | 3/2005 | Watkins |
| 2006/0160949 A1 | 7/2006 | Styranec |
| 2007/0088137 A1 | 4/2007 | Georgeau et al. |
| 2008/0217947 A1* | 9/2008 | Merryman .......... B60R 13/0815 296/39.1 |
| 2009/0181216 A1 | 7/2009 | Peng |
| 2010/0093942 A1 | 4/2010 | Silvis |
| 2010/0205896 A1 | 8/2010 | Kalwara |
| 2012/0045953 A1 | 2/2012 | Wang et al. |
| 2013/0096247 A1 | 4/2013 | Katsunori |
| 2014/0261965 A1 | 9/2014 | Tang et al. |
| 2016/0340905 A1 | 11/2016 | Tang et al. |

FOREIGN PATENT DOCUMENTS

| | | |
|---|---|---|
| JP | 2005169655 A | 6/2005 |
| WO | 00/37534 A1 | 6/2000 |
| WO | 2011/158906 A1 | 12/2011 |
| WO | 2014008501 A1 | 1/2014 |
| WO | 2014/145482 A2 | 9/2014 |
| WO | WO2015074031 A1 | 5/2015 |

OTHER PUBLICATIONS

International Search Report and Written Opinion dated Dec. 10, 2013, filed in PCT/US2013/049547.

* cited by examiner

ADHERED THERMOPLASTIC MEMBRANE ROOFING SYSTEM

This application claims the benefit of U.S. Provisional Application Ser. No. 61/915,169, filed on Dec. 12, 2013, which is incorporated herein by reference.

FIELD OF THE INVENTION

Embodiments of the present invention are directed toward an adhered thermoplastic membrane roofing system, wherein the membrane includes functionalized thermoplastic polymer in contact with an adhesive containing silicon-containing hydrolyzable terminal groups.

BACKGROUND OF THE INVENTION

Flat or low-sloped roofs are often covered with polymeric membranes. Common among the membranes that have the mechanical properties needed to be technologically useful are thermoset membranes prepared with EPDM rubber or thermoplastic membranes prepared with ethylene-propylene reactor copolymers. These membranes typically contain carbon black and/or mineral fillers, which provide advantageous mechanical properties to the membranes. These membranes also include flame retardants, such as magnesium hydroxide, in order to provide the membranes with sufficient flame resistance.

U.S. Pat. No. 4,996,812 discloses a composite roof structure including a layer of adhesive material, such as a foamed, cellular polyurethane adhesive, along with a flexible rubber or thermoplastic membrane including a fleece-like matting layer secured to the underside thereof. The adhesive is typically sprayed onto the roof substrate wherein, prior to solidification of the adhesive, the fleece-lined membrane is pressed into the adhesive so that the matting becomes embedded therein.

To simplify installation and to minimize costs associated with the polymeric membranes, a need exists for a non-fleece membrane sheet that can be directly adhered to the roof substrate.

SUMMARY OF THE INVENTION

Embodiments of the present invention provide an adhered roofing system comprising a roof substrate, a thermoplastic membrane including at least one layer that includes a functionalized thermoplastic polymer, and an adhesive securing the membrane to the substrate, where the adhesive includes a cured residue of a polymer having a silicon-containing hydrolyzable terminal group.

Other embodiments of the present invention provide a method for forming an adhered membrane roof system, the method comprising applying a bond adhesive to a substrate on a roof to form an adhesive layer, where the bond adhesive includes a polymer having a silicon-containing hydrolyzable terminal group and applying a membrane directly to the adhesive layer, where the membrane includes at least one layer that includes a functionalized thermoplastic polymer.

DETAILED DESCRIPTION OF ILLUSTRATIVE EMBODIMENTS

Embodiments of the present invention are based, at least in part, on the discovery of an adhered thermoplastic membrane roofing system, where the thermoplastic membrane is adhered using an adhesive that includes polymer having silicon-containing hydrolyzable terminal groups. At least a portion of the thermoplastic membrane contacting the adhesive includes a functionalized polymer. The adhered systems of the present invention are advantageously formed without the use of a secondary attachment mechanism, such as a fleece backing that is attached to the membrane. It is believed that the functionality of the functionalized polymer reacts or interacts with the silicon-containing hydrolyzable terminal group of the adhesive and thereby increases the affinity between the adhesive and the membrane surface. In fact, to the extent that the functionality reacts with the silicon-containing hydrolyzable terminal group of the adhesive, a chemical bond between the membrane and the adhesive system is believed to be present. Furthermore, it has advantageously been discovered that the polymer bearing a functionality can be added to the thermoplastic membranes without having a deleterious impact on the other performance attributes of the membrane.

Membrane Construction

Figure 1:
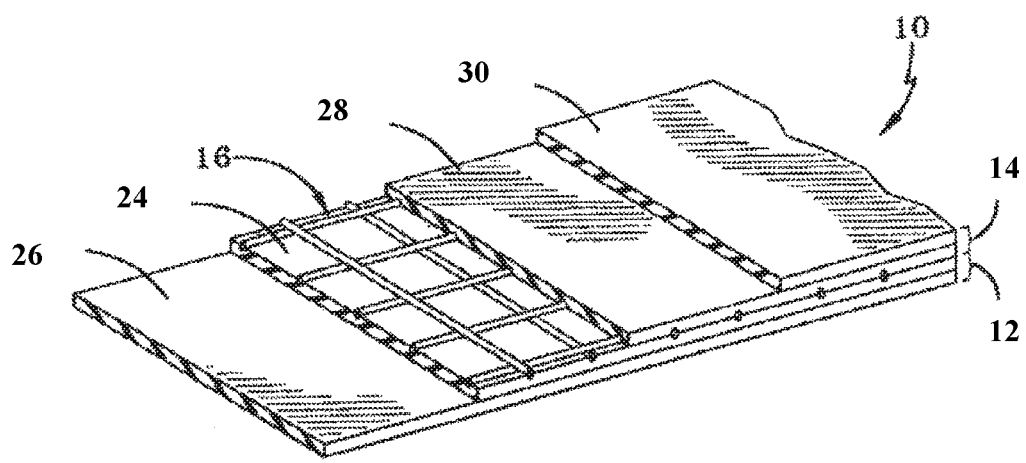
FIG. 1 is a perspective view of a multi-layered membrane including two co-extruded laminated layers according to embodiments of the present invention.
Figure 2:
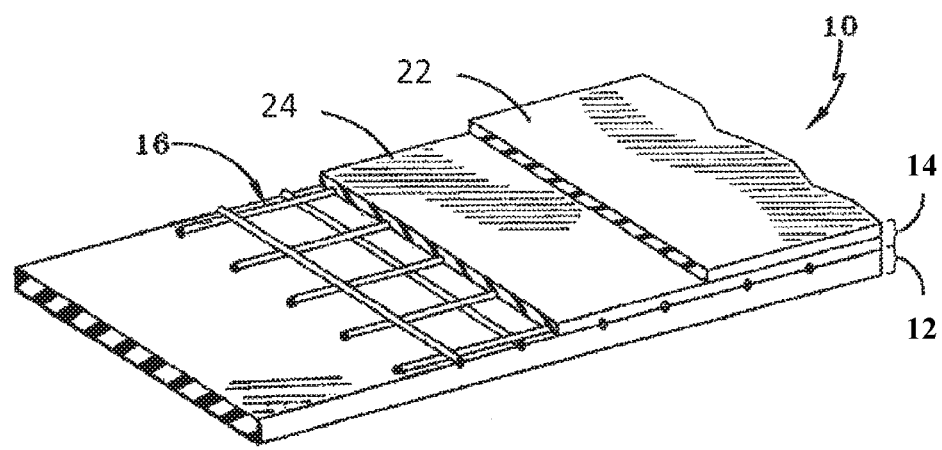
FIG. 2 is a perspective view of a multi-layered membrane including two laminated layers according to embodiments of the present invention.

In one or more embodiments, the membranes of the present invention include at least two layers laminated to one another with an optional scrim disposed between the layers. In one or more embodiments, both layers include the functionalized polymer dispersed within a thermoplastic polymer according to the present invention. In other embodiments, one layer of a two-layered, laminated membrane includes the functionalized polymer dispersed within a thermoplastic polymer according to the present invention. In one or more embodiments, the one layer of the two-layered, laminated membrane including the functionalized polymer is the lower layer or bottom layer of the membrane, which is the layer that is adjacent to the roof substrate; i.e. the side opposite the surface of the membrane that is exposed to the environment. Examples of two-layered, laminated membranes are shown in FIGS. 1 and 2, which show membrane 10 having first or lower layer 12, which includes the functionalized polymer, the second or upper layer 14, which may be devoid or substantially devoid of the functionalized polymer, and optional scrim 16 disposed therebetween. Reference to substantially devoid includes that amount or less of a particular constituent (e.g. functionalized polymer) that does not have an appreciable impact on the layer or membrane. Due to the presence of the functionalized polymer within lower layer 12, the membrane can be secured to a roof substrate by use of an adhesive including polymers having silicon-containing hydrolyzable terminal groups, which is believed to react or interact with the functionalized polymer.

In one or more embodiments, the membranes of the present invention are multi-layered membranes that include one or more coextruded layers. In this respect, U.S. Publ.

Nos. 2009/0137168, 2009/0181216, 2009/0269565, 2007/0193167, and 2007/0194482 are incorporated herein by reference. In one or more embodiments, at least one of the coextruded layers includes a functionalized polymer according to one or more aspects of the present invention. For example, and with reference to FIG. 1, lower or bottom layer 12 includes coextruded layers 24 and 26, and upper layer 14 optionally includes coextruded layers 28 and 30. Lower layer 12 and upper layer 14 may be laminated to each other with optional scrim 16 disposed therebetween. Coextruded layer 26, which may be referred to as the bottom coextruded layer 26, includes the functionalized polymer according the present invention. Due to the presence of the functionalized polymer within bottom coextruded layer 26, the membrane can be secured to a roof substrate by use of an adhesive including polymers having silicon-containing hydrolyzable terminal groups, which is believed to react or interact with the functionalized polymer. In one or more embodiments, one of the co-extruded layers of upper layer 14 may include functionalized polymer; e.g., top layer 30 may include functionalized polymer. As a result of this configuration, adjacent membranes can be lap-sealed using the silicon-containing adhesive as well.

In one or more embodiments, the thickness of coextruded layers 24 and 26 may be the same or substantially similar. In other embodiments, the thickness of coextruded bottom layer 26 may be thinner than coextruded upper layer 24, which will provide economic benefit by minimizing the amount of the functionalized polymer within the overall membrane while still providing the functionalized polymer in a location that will allow it to provide adequate bonding to the adhesive.

In one or more embodiments, the remaining layers of the multi-layered membrane may include the functionalized polymer. In other embodiments, the remaining layers of the multi-layered membrane may be devoid of functionalized polymer. For example, the coextruded upper layer 30 may be devoid of the functionalized polymer. Also, the one or more optional coextruded layers of the upper ply (e.g. coextruded layer 24 of ply 12) may be devoid of the functionalized polymer. Likewise, one or more optional layers of the lower ply (e.g., layer 24 of lower layer 12) may be devoid of funtionalized polymer.

In one or more embodiments, the overall thickness of the membranes of the present invention may be from about 20 mils up to about 100 mils, and in certain embodiments from about 30 mils to about 80 mils. The layers (e.g., layers 12 and 14) may each account for about half of the overall thickness (e.g., 10 mils to about 40 mils), with a small fraction of the overall thickness (e.g., about 5 mils) deriving from the presence of the scrim. Where the membrane includes one or more coextruded layers, the bottom layer 26 may, in certain embodiments, have a thickness from about 2 mils to about 20 mils, or in other embodiments from about 4 mils to about 12 mils.

In one or more embodiments, the membranes of the present invention may also be constructed by laminating a thin sheet of polymer having dispersed therein the functionalized polymer to one or more sheets of thermoplastic membrane. For example, a thin film of polymer having the functionalized polymer dispersed therein may be laminated to a conventional thermoplastic membrane or to a component (i.e., the lower layer) of a conventional thermoplastic membrane. The thin sheet having the functionalized polymer dispersed therein may have a thickness of about 2 mils to about 20 mils, or in other embodiments from about 4 mils to about 12 mils.

In one or more embodiments, the scrim may include conventional scrim. For example, polyester scrims may be employed. In these or other embodiments, polyester scrims including fiberglass reinforcement may be employed.

Constituents of the Membrane

Thermoplastic Component

In one or more embodiments, regardless of the number of layers or co-extrudates of the membranes, each layer or co-extrudate includes a thermoplastic polymer (excluding any scrim reinforcement). Any other ingredients or constituents of each layer is dispersed within the thermoplastic polymer, and therefore reference may be made to a thermoplastic component that forms a matrix in which the other substituents are dispersed. As noted above, at least one layer of the membrane includes a functionalized polymer, which is likewise dispersed within the thermoplastic component or matrix or is co-continuous therewith. Inasmuch as the functionalized polymer may also be a thermoplastic polymer, reference may be made to first and second thermoplastic polymers. For example, the thermoplastic polymer forming the matrix, which accounts for the major volume fraction of any given layer, may be referred to as a first thermoplastic polymer, and where the functionalized polymer is also a thermoplastic polymer, it may be referred to as a second thermoplastic polymer bearing a functionality or group.

In one or more embodiments, the thermoplastic component includes a thermoplastic olefinic polymer, which includes one or more mer units deriving from olefinic monomer. Blends of polymers may also be used. These blends include physical blends as well as reactor blends. In one or more embodiments, the thermoplastic olefinic polymer may derive from recycled thermoplastic polyolefin membranes as described in copending application Ser. No. 11/724,768, which is incorporated herein by reference.

In one or more embodiments, the thermoplastic olefinic polymer may include an olefinic reactor copolymer, which may also be referred to as in-reactor copolymer. Reactor copolymers are generally known in the art and may include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel); these materials are believed to include in-reactor blends of ethylene-propylene rubber and polypropylene or polypropylene copolymers. In one or more embodiments, the in-reactor copolymers may be physically blended with other polyolefins. For example, in reactor copolymers may be blended with linear low density polyethene.

In other embodiments, the thermoplastic component may include a physical blend of chemically-distinct olefinic polymers. In one or more embodiments, blends of propylene-based thermoplastic polymer, plastomer, and/or low density polyethylene may be used. In other embodiments, the thermoplastic olefinic component is a blend of a linear low density polyethylene and a propylene-based plastic.

In one or more embodiments, the propylene-based polymer may include polypropylene homopolymer or copolymers of propylene and a comonomer, where the copolymer includes, on a mole basis, a majority of mer units deriving from propylene. In one or more embodiments, the propylene-based copolymers may include from about 2 to about 6 mole percent, and in other embodiments from about 3 to about 5 mole percent mer units deriving from the comonomer with the remainder including mer units deriving from propylene. In one or more embodiments, the comonomer includes at least one of ethylene and an α-olefin. The α-olefins may include butene-1, pentene-1, hexene-1, oxtene-1, or 4-methyl-pentene-1. In one or more embodiments, the copolymers of propylene and a comonomer may include random copolymers. Random copolymers may include those propylene-based copolymers where the comonomer is randomly distributed across the polymer backbone.

The propylene-based polymers employed in one or more embodiments of this invention may be characterized by a melt flow rate of from about 0.5 to about 15 dg/min, in other embodiments from about 0.7 to about 12 dg/min, in other embodiments from about 1 to about 10 dg/min, and in other embodiments from about 1.5 to about 3 dg/min per ASTM D-1238 at 230° C. and 2.16 kg load. In these or other embodiments, the propylene-based polymers may have a weight average molecular weight ($M_w$) of from about $1 \times 10^5$ to about $5 \times 10^5$ g/mole, in other embodiments from about $2 \times 10^5$ to about $4 \times 10^5$ g/mole, and in other embodiments from about $3 \times 10^5$ to about $4 \times 10^5$ g/mole, as measured by GPC with polystyrene standards. The molecular weight distribution of these propylene-based copolymer may be from about 2.5 to about 4, in other embodiments from about 2.7 to about 3.5, and in other embodiments from about 2.8 to about 3.2.

In one or more embodiments, propylene-based polymers may be characterized by a melt temperature ($T_m$) that is from about 165° C. to about 130° C., in other embodiments from about 160 to about 140° C., and in other embodiments from about 155° C. to about 140° C. In one or more embodiments, particularly where the propylene-based polymer is a copolymer of propylene and a comonomer, the melt temperature may be below 160° C., in other embodiments below 155° C., in other embodiments below 150° C., and in other embodiments below 145° C. In one or more embodiments, they may have a crystallization temperature ($T_c$) of about at least 90° C., in other embodiments at least about 95° C., and in other embodiments at least 100° C., with one embodiment ranging from 105° to 115° C.

Also, these propylene-based polymers may be characterized by having a heat of fusion of at least 25 J/g, in other embodiments in excess of 50 J/g, in other embodiments in excess of 100 J/g, and in other embodiments in excess of 140 J/g.

In one or more embodiments, the propylene-based polymers may be characterized by a flexural modulus, which may also be referred to as a 1% secant modulus, in excess of 120,000 psi, in other embodiments in excess of 125,000, in other embodiments in excess of 130,000 psi, in other embodiments in excess of 133,000 psi, in other embodiments in excess of 135,000 psi, and in other embodiments in excess of 137,000 psi, as measured according to ASTM D-790.

Useful propylene-based polymers include those that are commercially available. For example, propylene-based polymers can be obtained under the tradename PP7620Z™ (Fina), PP33BF01™ (Equistar), or under the tradename TR3020™ (Sunoco).

In one or more embodiments, the thermoplastic polymer may include a blend of olefinic polymers. Useful blends include those described in International Application No. PCT/US06/033522 which is incorporated herein by reference. For example, a particular blend may include (i) a plastomer, (ii) a low density polyethylene, and (iii) a propylene-based polymer.

In one or more embodiments, the plastomer includes an ethylene-α-olefin copolymer. The plastomer employed in one or more embodiments of this invention includes those described in U.S. Pat. Nos. 6,207,754, 6,506,842, 5,226,392, and 5,747,592, which are incorporated herein by reference. This copolymer may include from about 1.0 to about 15 mole percent, in other embodiments from about 2 to about 12, in other embodiments from about 3 to about 9 mole percent, and in other embodiments from about 3.5 to about 8 mole percent mer units deriving from α-olefins, with the balance including mer units deriving from ethylene. The α-olefin employed in preparing the plastomer of one or more embodiments of this invention may include butene-1, pentene-1, hexene-1, octene-1, or 4-methyl-pentene-1.

The plastomer of one or more embodiments of this invention can be characterized by a density of from about 0.865 g/cc to about 0.900 g/cc, in other embodiments from about 0.870 to about 0.890 g/cc, and in other embodiments from about 0.875 to about 0.880 g/cc per ASTM D-792. In these or other embodiments, the density of the plastomers may be less than 0.900 g/cc, in other embodiments less than 0.890 g/cc, in other embodiments less than 0.880 g/cc, and in other embodiments less than 0.875 g/cc.

In one or more embodiments, the plastomer may be characterized by a weight average molecular weight of from about $7 \times 10^4$ to $13 \times 10^4$ g/mole, in other embodiments from about $8 \times 10^4$ to about $12 \times 10^4$ g/mole, and in other embodiments from about $9 \times 10^4$ to about $11 \times 10^4$ g/mole as measured by using GPC with polystyrene standards. In these or other embodiments, the plastomer may be characterized by a weight average molecular weight in excess of $5 \times 10^4$ g/mole, in other embodiments in excess of $6 \times 10^4$ g/mole, in other embodiments in excess of $7 \times 10^4$ g/mole, and in other embodiments in excess of $9 \times 10^4$ g/mole. In these or other embodiments, the plastomer may be characterized by a molecular weight distribution ($M_w/M_n$) that is from about 1.5 to 2.8, in other embodiments 1.7 to 2.4, and in other embodiments 2 to 2.3.

In these or other embodiments, the plastomer may be characterized by a melt index of from about 0.1 to about 8, in other embodiments from about 0.3 to about 7, and in other embodiments from about 0.5 to about 5 per ASTM D-1238 at 190° C. and 2.16 kg load.

The uniformity of the comonomer distribution of the plastomer of one or more embodiments, when expressed as a comonomer distribution breadth index value (CDBI), provides for a CDBI of greater than 60, in other embodiments greater than 80, and in other embodiments greater than 90.

In one or more embodiments, the plastomer may be characterized by a DSC melting point curve that exhibits the occurrence of a single melting point break occurring in the region of 50 to 110° C.

The plastomer of one or more embodiments of this invention may be prepared by using a single-site coordination catalyst including metallocene catalyst, which are conventionally known in the art.

Useful plastomers include those that are commercially available. For example, plastomer can be obtained under the tradename EXXACT™ 8201 (ExxonMobil); or under the tradename ENGAGE™ 8180 (Dow DuPont).

In one or more embodiments, the low density polyethylene includes an ethylene-α-olefin copolymer. In one or more embodiments, the low density polyethylene includes linear low density polyethylene. The linear low density polyethylene employed in one or more embodiments of this invention may be similar to that described in U.S. Pat. No. 5,266,392, which is incorporated herein by reference. This copolymer may include from about 2.5 to about 13 mole percent, and in other embodiments from about 3.5 to about 10 mole percent, mer units deriving from α-olefins, with the balance including mer units deriving from ethylene. The α-olefin included in the linear low density polyethylene of one or more embodiments of this invention may include butene-1, pentene-1, hexene-1, octene-1, or 4-methyl-pentene-1. In one or more embodiments, the linear low density polyethylene is devoid or substantially devoid of propylene mer units (i.e., units deriving from propylene). Substantially devoid refers to that amount or less of propylene mer units that would otherwise have an appreciable impact on the copolymer or the compositions of this invention if present.

The linear low density polyethylene of one or more embodiments of this invention can be characterized by a density of from about 0.885 g/cc to about 0.930 g/cc, in other embodiments from about 0.900 g/cc to about 0.920 g/cc, and in other embodiments from about 0.900 g/cc to about 0.910 g/cc per ASTM D-792.

In one or more embodiments, the linear low density polyethylene may be characterized by a weight average molecular weight of from about $1 \times 10^5$ to about $5 \times 10^5$ g/mole, in other embodiments $2 \times 10^5$ to about $10 \times 10^5$ g/mole, in other embodiments from about $5 \times 10^5$ to about $8 \times 10^5$ g/mole, and in other embodiments from about $6 \times 10^5$ to about $7 \times 10^5$ g/mole as measured by GPC with polystyrene standards. In these or other embodiments, the linear low density polyethylene may be characterized by a molecular weight distribution ($M_w/M_n$) of from about 2.5 to about 25, in other embodiments from about 3 to about 20, and in other embodiments from about 3.5 to about 10. In these or other embodiments, the linear low density polyethylene may be characterized by a melt flow rate of from about 0.2 to about 10 dg/min, in other embodiments from about 0.4 to about 5 dg/min, and in other embodiments from about 0.6 to about 2 dg/min per ASTM D-1238 at 230° C. and 2.16 kg load.

The linear low density polyethylene of one or more embodiments of this invention may be prepared by using a convention Ziegler Natta coordination catalyst system.

Useful linear low density polyethylene includes those that are commercially available. For example, linear low density polyethylene can be obtained under the tradename Dowlex™ 2267G (Dow); or under the tradename DFDA-1010 NT7 (Dow); or under the tradename GA502023 (Lyondell).

Functionalized Thermoplastic Polymer

In one or more embodiments, the functionalized thermoplastic polymer includes at least one functional group. The functional group, which may also be referred to as a functional substituent or functional moiety, includes a hetero atom. In one or more embodiments, the functional group includes a polar group. Examples of polar groups include hydroxy, carbonyl, ether, ester, halide, amine, imine, nitrile, oxirane (e.g., epoxy ring) or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon polymer. In these or other embodiments, the functional group may include an ester group. In specific embodiments, the ester group is a glycidyl group, which is an ester of glycidol and a carboxylic acid. A specific example is a glycidyl methacrylate group.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5624,999, and 6,503,984, which are incorporated herein by reference.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a weight average molecular weight ($M_w$) of from about 100 kg/mole to about 2,000 kg/mole, and in other embodiments from about 300 kg/mole to about 600 kg/mole. They may also characterized by a number-average molecular weight ($M_n$) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, these thermoplastic polymer, prior to grafting, may be characterized by a melt flow of from about 0.3 to about 2,000 dg/min, in other embodiments from about 0.5 to about 1,000 dg/min, and in other embodiments from about 1 to about 1,000 dg/min, per ASTM D-1238 at 230° C. and 2.16 kg load.

In one or more embodiments, these thermoplastic resins, prior to grafting, may have a melt temperature ($T_m$) that is from about 110° C. to about 250° C., in other embodiments from about 120 to about 170° C., and in other embodiments from about 130° C. to about 165° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α, β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight percent of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight percent functionalization, in these or other embodiments, the functionalized thermoplastic polymers may include less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by a melt flow rate of from about 20 to about 2,000 dg/min, in other embodiments from about 100 to about 1,500 dg/min, and in other embodiments from about 150 to about 750 dg/min, per ASTM D-1238 at 230° C. and 2.16 kg load. In one or more embodiments, where the functionalized thermoplastic polymer is a functionalized ethylene-based polymer, it can be characterized by a melt flow index of from about 0.2 to about 2,000 dg/min, in other embodiments from about 1 to about 1,000 dg/min, and in other embodiments from about 5 to about 100 dg/min, per ASTM D-1238 at 190° C. and 2.16 kg load.

Functionalized thermoplastic polymers are commercially available. For example, maleated propylene-based polymers may be obtained under the tradename FUSABOND™ (DuPont), POLYBOND™ (Crompton), and EXXELOR™ (ExxonMobil). Another example includes polymers or oligomers including one or more glycidyl methacrylate groups such as Lotader™ AX8950 (Arkema).

Other Ingredients

The thermoplastic membranes of the present invention may also include other ingredients such as those that are convention in thermoplastic membranes. For example, other useful additives or constituents may include flame retardants, stabilizers, pigments, and fillers.

In one or more embodiments, useful flame retardants include and compound that will increase the burn resistivity, particularly flame spread such as tested by UL 94 and/or UL 790, of the laminates of the present invention. Useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™. Those flame retardants from the foregoing list that are believed to operate by forming a char layer include ammonium polyphosphate and melamine polyphosphate.

In one or more embodiments, treated or functionalized magnesium hydroxide may be employed. For example, magnesium oxide treated with or reacted with a carboxylic acid or anhydride may be employed. In one embodiment, the magnesium hydroxide may be treated or reacted with stearic acid. In other embodiments, the magnesium hydroxide may be treated with or reacted with certain silicon-containing compounds. The silicon-containing compounds may include silanes, polysiloxanes including silane reactive groups. In other embodiments, the magnesium hydroxide may be treated with maleic anhydride. Treated magnesium hydroxide is commercially available. For example, Zerogen™ 50.

Examples of halogenated flame retardants may include halogenated organic species or hydrocarbons such as hexabromocyclododecane or N,N'-ethylene-bis-(tetrabromophthalimide). Hexabromocyclododecane is commercially available under the tradename CD-75P™ (ChemTura). N,N'-ethylene-bis-(tetrabromophthalimide) is commercially available under the tradename Saytex™ BT-93 (Albemarle).

In one or more embodiments, the use of char-forming flame retardants (e.g. ammonium polyphosphate and melamine polyphosphate) has unexpectedly shown advantageous results when used in conjunction with nanoclay within the cap layer of the laminates of the present invention. It is believed that there may be a synergistic effect when these compounds are present in the cap layer. As a result, the cap layer of the laminates of the certain embodiments of the present invention are devoid of or substantially devoid of halogenated flame retardants and/or flame retardants that release water upon thermal decomposition. Substantially devoid referring to that amount or less that does not have an appreciable impact on the laminates, the cap layer, and/or the burn resistivity of the laminates.

In one or more embodiments, the membranes of the invention may include a stabilizers. Stabilizers may include one or more of a UV stabilizer, an antioxidant, and an antiozonant. UV stabilizers include Tinuvin™ 622. Antioxidants include Irganox™ 1010.

Amounts

In one or more embodiments, the one or more layers of the membranes of the present invention that include functionalized polymer include at least 3 weight percent, in other embodiments at least 5 weight percent, and in other embodiments at least 7 weight percent of the functionalized polymer (e.g. hydroxyl-bearing polymer) based on the entire weight of the layer that includes the functionalized polymer. In one or more embodiments, the one or more layers of the membranes of the present invention that include the functionalized polymer include at most 50 weight percent, in other embodiments at most 25 weight percent, and in other embodiments at most 15 weight percent of the functionalized polymer based on the entire weight of the layer that includes the functionalized polymer. In one or more embodiments, the one or more layers of the thermoplastic membranes that include the functionalized polymer include from about 3 to about 50, in other embodiments from about 5 to about 25, and in other embodiments from about 7 to about 15 weight percent of the functionalized polymer based upon the entire weight of the layer that includes the functionalized polymer.

Method of Making

In one or more embodiments, the compositions and membranes of the present invention may be prepared by employing conventional techniques. For example, the various ingredients can be separately fed into a reaction extruder and pelletized or directly extruded into membrane or laminate sheet. In other embodiments, the various ingredients can be combined and mixed within a mixing apparatus such as an internal mixer and then subsequently fabricated into membrane sheets or laminates.

In one or more embodiments, the membranes of the present invention may be prepared by extruding a polymeric composition into a sheet. Multiple sheets may be extruded and joined to form a laminate. A membrane including a reinforcing layer may be prepared by extruding at least one sheet on and/or below a reinforcement (e.g., a scrim). In other embodiments, the polymeric layer may be prepared as separate sheets, and the sheets may then be calandered with the scrim sandwiched therebetween to form a laminate. In one or more embodiments, the membranes of the present invention are prepared by employing co-extrusion technology. Useful techniques include those described in co-pending U.S. Ser. Nos. 11/708,898 and 11/708,903, which are incorporated herein by reference.

Following extrusion, and after optionally joining one or more polymeric layers, or optionally joining one or more polymeric layer together with a reinforcement, the membrane may be fabricated to a desired thickness. This may be accomplished by passing the membrane through a set of squeeze rolls positioned at a desired thickness. The membrane may then be allowed to cool and/or rolled for shipment and/or storage.

The polymeric composition that may be extruded to form the polymeric sheet may include the ingredients or constituents described herein. For example, the polymeric composition may include thermoplastic polyolefin, and functionalized polymers defined herein. The ingredients may be mixed together by employing conventional polymer mixing equipment and techniques. In one or more embodiments, an extruder may be employed to mix the ingredients. For example, single-screw or twin-screw extruders may be employed.

INDUSTRIAL APPLICABILITY

The membranes of one or more embodiments of the present invention are useful in a number of applications. In one embodiment, the membranes may be useful for roofing membranes that are useful for covering flat or low-sloped roofs. In other embodiments, the membranes may be useful as geomembranes. Geomembranes include those membranes employed as pond liners, water dams, animal waste treatment liners, and pond covers.

Figure 3:
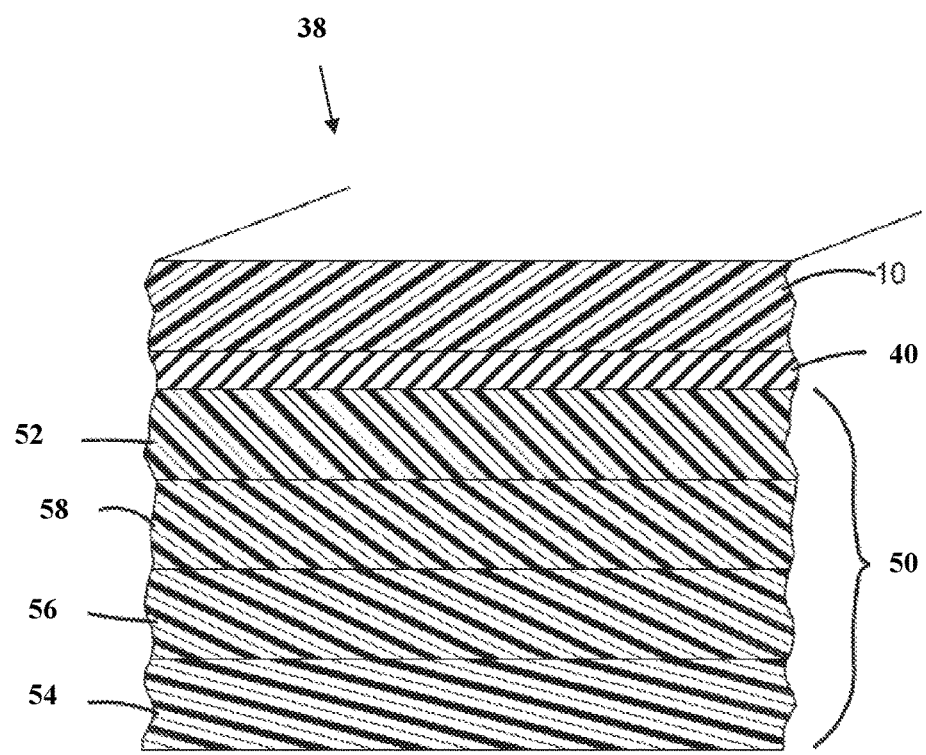
FIG. 3 is a perspective, cross sectional view of a roof assembly according to embodiments of the present invention.

As described above, the membranes of one or more embodiments of the present invention may be employed as roofing membranes. These membranes include thermoplastic roofing membranes including those that meet the specifications of ASTM D-6878-03. These membranes maybe employed to cover flat or low/sloped roofs. These roofs are generally known in the art as disclosed in U.S. Ser. Nos. 60/586,424 and 11/343,466, and International Application No. PCT/US2005/024232, which are incorporated herein by reference. As shown in FIG. 3, a flat or low-sloped roof assembly 40 may include a roof deck 82, and optional insulation layer 84, and membrane 10 according to the present invention.

Advantageously, the membranes of the present invention can be used to prepare adhered roofing systems, including fully-adhered systems and partially-adhered systems. In this regard, reference can be made to FIG. 3, which shows a fully-adhered roofing system 38 including membrane 10 prepared in accordance with one or more embodiments of the present invention (i.e., at least the lower most portion thereof, which is in contact with the substrate, includes functionalized polyolefin). Membrane 10 is adhesively secured to substrate 50 through adhesive 40, which, as described herein, may include a silicon-containing adhesive polymer. Substrate 50 may include one or more of an existing membrane 52, a coverboard 58, an insulation layer 56, and a roof deck 54.

In one or more embodiments, the membranes are used in conjunction with adhesive compositions that include polymer having silicon-containing hydrolyzable terminal groups. Generally, these adhesives can be applied to a roof substrate to form a layer of adhesive, and then the membranes of the present invention, which are devoid of any fleece backing, can subsequently be contacted to the layer of adhesive disposed on the substrate. The adhesive (e.g., polymer with silicon-containing hydrolyzable group) advantageously cures in the presence of atmospheric moisture to produce a cured residue of the adhesive composition that binds to the roof substrate and the membrane. Advantageously, the process can be used to construct a roofing system meeting the standards of UL and Factory Mutual for wind uplift in the absence of a fleece or other backing material applied to the membrane.

As noted above, the substrate to which the adhesive composition is applied may include a roof deck, which may include steel, concrete, and/or wood. In other embodiments, the adhesive composition may be applied to insulation materials, such as insulation boards and cover boards. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood. In yet other embodiments, the adhesive composition may be applied to existing membranes. These existing membranes may include cured rubber systems such as EPDM membranes, thermoplastic polymers systems such as TPO membranes, or asphalt-based systems such as modified asphalt membranes and/or built roof systems. Advantageously, practice of the present invention provides adhesion to asphalt-based substrates by offering sufficient oil resistance, which is required to maintain sufficient adhesion to asphalt systems.

ADHESIVE COMPOSITION

As discussed above, the adhesive composition employed in one or more embodiments of this invention includes polymers having silicon-containing a hydrolyzable terminal groups. In one or more embodiments, the adhesive also includes a tackifier resin. In addition, the adhesive compositions may include an adhesion promoter, a filler, a catalyst, an antioxidant, a stabilizer, a moisture scavenger, a crosslink inhibitor (a.k.a retarder), a plasticizer, and/or a thixotropic compound. In one or more embodiments, the adhesive composition is a 100% solids composition (i.e. it is solvent free). Adhesive compositions of this nature are described in International Publication No. WO 2014/145482 and U.S. Pat. No. 7,767,308, which are incorporated herein by reference.

In one or more embodiments, the polymers having silicon-containing hydrolyzable terminal groups may include silane-terminated polymers, which may also be referred to as silyl-terminated polymers. The term "silicon-containing hydrolyzable terminal group" as used herein means a group wherein at least one silicon atom is combined with a hydrolyzable group such as a methoxy group which is subject to hydrolysis and polymerization by moisture.

The backbone of the polymer having silicon-containing hydrolyzable terminal groups may be comprised of polyethers, polyesters, polyurethanes (SPUR), or other suitable backbones.

Suitable polymers having silicon-containing hydrolyzable terminal groups are commercially available and/or can be prepared in accordance with techniques known in the art. Examples of suitable commercially available polymers having silicon-containing hydrolyzable terminal groups are Geniosil™. STP-E 35 trimethoxysilylpropyl-carbamate-terminated polyether, and Geniosil™. STP-E 30 silane-terminated polyether with dimethoxy(methyl)silylmethylcarbamate terminal groups, both of which are available from Wacker Chemical. Another commercially available polymer having silicon-containing hydrolyzable terminal groups that may be employed in the adhesive compositions of this invention is "SPUR+" silane-terminated polyurethanes, which are available from Momentive. Another suitable commercially available material is "MS" silyl-terminated polyether (S227H, S303, S327, S303H, SAX350), available from Kaneka.

In one or more embodiments, the tackifier resin is a hydrocarbon resin. In other embodiments, the tackifier resin is a phenolic resin.

In one or more embodiments, the hydrocarbon resins may include natural resins, synthetic resins, and low molecular weight polymers or oligomers. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomer can include $C_8$, $C_9$, and $C_{10}$ aromatic monomer. Examples of aromatic monomer include styrene, indene, derivatives of styrene, derivatives of indene, and combinations thereof.

In one or more embodiments, examples of hydrocarbon resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

In certain embodiments, the synthetic aliphatic or aromatic hydrocarbon resins may be characterized by a number average molecular weight ($M_n$) of from about 300 g/mole to about 3,000 g/mole, and in other embodiments from about 500 g/mole to about 2,000 g/mole. These hydrocarbon resins may also be characterized by a weight average molecular weight ($M_w$) of from about 500 g/mole to about 6,000 g/mole, and in other embodiments from about 700 g/mole to about 5,000 g/mole. Molecular weight may be determined by size exclusion chromatography (SEC) by using a Waters 150 gel permeation chromatograph equipped with the differential refractive index detector and calibrated using polystyrene standards.

In certain embodiments, the hydrocarbon resins include those produced by thermal polymerization of dicyclopentadiene (DCPD) or substituted DCPD, which may further include aliphatic or aromatic monomers. In one embodiment, the DCPD or substituted DCPD is copolymerized with aromatic monomer, and the final product includes less than 10% aromatic content. In another embodiment, the hydrocarbon resin derives from the copolymerization of both aliphatic monomer and aromatic monomer. In particular embodiments, the dicyclopentadiene tackifier resin is hydrogenated. Hydrogenated dicyclopentadiene tackifier resins are commercially available from Neville.

In one or more embodiments, synthetic oligomers may include dimers, trimers, tetramers, pentamers, hexamers, septamers, and octamers of petroleum distillate monomer. In one or more embodiments, this petroleum distillate monomer may have a boiling point of from about 30° to about 210° C. The oligomers may include byproducts of resin polymerization including thermal and catalytic polymerization. For example, oligomers may derive from processes where DCPD, aliphatic monomer, and/or aromatic monomer are oligomerized.

The hydrocarbon resins may be characterized by an aromatic content of from about 1 to about 60, in other embodiments from about 2 to about 40, and in other embodiments from about 5 to about 10. In one or more embodiments, the tackifier resins are hydrogenated or partially hydrogenated; useful resins include those that are at least 50 percent, in other embodiments at least 80 percent, in other embodiments at least 95 percent, and in other embodiments at least 99 percent or fully hydrogenated. For example, the hydrocarbon resin prior to grafting may contain less than 90, in other embodiments less than 50, in other embodiments less than 25, in other embodiments less than 10, in other embodiments less than 2, in other embodiments less than 1, in other embodiments less than 0.5, and in other embodiments less than 0.05 olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the hydrocarbon resin may be characterized by a softening point of from about 5° C. to about 210° C., in other embodiments from about 65° C. to about 170° C., and in other embodiments from about 90° C. to about 140° C. Softening point can be determined according to ASTM E-28 (Revision 1996).

In these or other embodiments, the hydrocarbon resin may be characterized by a glass transition temperature of less than 120° C., in other embodiments less than 110° C., and in other embodiment from about −40° C. to about 80° C. Glass transition temperature may be determined according to ASTM D 341-88 by using differential scanning calorimetry.

In these or other embodiments, the hydrocarbon resin may be characterized by a Saponification number (mg KOH/g resin material) of greater than 10, in other embodiments greater than 15, and in other embodiments greater than 19.

In these or other embodiments, the hydrocarbon resin may be characterized by an acid number greater than 10, in other embodiments greater than 15, and in other embodiments greater than 20, and in other embodiments greater than 25.

In particular embodiments, the tackifier resin is a phenolic resin. In one or more embodiments, the phenolic resins that may be employed in the compositions of this invention include resol-type and novolak-type phenolic resins obtained by condensation reaction of phenolic compounds, e.g., phenol, cresol, xylenol, resorcinol, an alkylphenol, and a modified phenol such as cashew nut shell oil modified phenol or tall oil modified phenol, with aldehyde compounds, e.g., formaldehyde and paraformaldehyde; and nitrogen-containing phenol resins obtained by condensation reaction of the above-mentioned phenolic compounds and aldehyde compounds in the presence of a catalyst such as ammonia or an amine compound. The phenol resins may be employed alone or in admixture. In one or more embodiments, the term phenolic resin refers to a phenol-formaldehyde resin. For example, the term phenolic resin may include a novolac resin, which is a phenol-formaldehyde resin where the molar ratio of the formaldehyde to phenol is less than one. These resins are typically synthesized by using an acid catalyst. The term phenolic resin also refers resol resins wherein the molar ratio of the formaldehyde to phenol is greater than one. These resins are typically synthesized by using a base catalyst.

In one or more embodiments, the adhesion promoter includes a non-polymeric silicon-containing hydrocarbon compound that has a lower molecular weight than the polymer having a silicon-containing hydrolysable group (i.e. the silane-terminate polymer). Also, the adhesion promoter includes at least one hydrolyzable group capable of reacting with a hydrolyzed functional group on the polymer having silicon-containing hydrolyzable terminal groups, and includes at least one moiety capable of interacting (i.e., promoting adhesion) with materials that are to be bonded with one another (such as a rubber membrane material). The expression non-polymeric, as used to modify the silicon-containing hydrocarbon compound is meant to exclude polymers and copolymers having at least 10 repeat units or monomeric units, such as urethane prepolymers having silicon-containing hydrolyzable terminal groups, but is meant to encompass oligomeric silicon-containing hydrolyzable compounds having fewer than 10 repeat units or monomers, and which are useful for promoting adhesion between a substrate and a cured adhesive composition. Examples of suitable aminosilane adhesion promoters that may function as the non-polymeric silicon-containing hydrolyzable compound include, but are not limited to, gamma-aminopropyltrimethoxysilane, gamma-aminopropyltriethoxysilane, gamma-(aminoethyl-aminopropyltrimethoxy-silane, methylaminopropyldimethoxysilane, methyl-gamma-(aminoethyl)-aminopropyldimethoxysilane, gamma-dimethylaminopropyltrimethoxysilane, and the like.

In one or more embodiments, examples of a plasticizer include phthalic acid esters (such as dioctyl phthalate, diisooctyl phthalate, dibutyl phthalate, diundecyl phthalate, diisononyl phthalate, diisodecyl phthalate, diisodocecyl phthalate and butylbenzyl phthalate); aliphatic dibasic acid esters (such as dioctyl adipate, isodecyl succinate, and dibutyl sebacate); glycol esters (such as diethylene glycol dibenzoate and pentaerythritol ester); aliphatic esters (such as butyl oleate and methyl acetylricinoleate); phosphoric acid esters (such as tricresyl phosphate, trioctyl phosphate, and octyldiphenyl phosphate); epoxy plasticizers (such as epoxidated soybean oil, epoxidated linseed oil, and benzyl epoxystearate); polyester plasticizers (such as polyesters of dibasic acid and a divalent alcohol); polyethers (such as polypropylene glycol and its derivatives); polystyrenes (such as poly-α-methylstyrene and polystyrene); polybutadiene butadiene-acrylonitrile copolymer; polychloroprene; polyisoprene; polybutene; chlorinated paraffins; benzoic esters; glycol esters; phosphoric esters; sulfonic esters; and mixtures thereof, wherein any given compound is different than an ingredient otherwise included in the composition of the invention.

In addition, high-molecular weight plasticizers can also be used. Specific examples of such high-molecular weight plasticizer include, but are not limited to, vinyl polymers obtainable by polymerizing a vinyl monomer by various methods; polyalkylene glycol esters such as diethylene glycol dibenzoate, triethylene glycol dibenzoate and pentaerythritol esters; polyester plasticizers obtainable from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; polyethers such as polyether polyols, e.g. polyethylene glycol, polypropylene glycol and polytetramethylene glycol that have a molecular weight of 500 or more, and even further 1,000 or more, and derivatives of these as obtainable by converting the hydroxyl groups of these polyether polyols to an ester, ether or the like groups; polystyrenes such as polystyrene and poly-α-methylstyrene; polybutadiene, polybutene, polyisobutylene, butadiene-acrylonitrile, polychloroprene and the like. In one or more specific embodiments, plasticizers include propylene glycol dibenzoate, diisononyl phthalate, and soy methyl esters, Mesamol II, HB-40, butylbenzylphthalate. In other specific embodiments, the plasticizers employed are phthalic acid esters. In one or more embodiments, the plasticizers may include high boiling solvents that promote tackification, lowering of viscosity, and sprayability.

In one or more embodiments, a moisture scavenger is employed in the adhesive compositions of this invention. Moisture scavengers that may be employed include chemical moisture scavengers and physical moisture scavengers that absorb and/or adsorb moisture. In particular embodiments, the chemical moisture scavenger is vinyl-trimethoxysilane, which may be employed in an amount of up to about 3% by weight based on the total weight of the adhesive composition. An example of a physical moisture scavenger that may be employed is 3 A Sieves from UOP, which is a zeolite having 3 Angstrom pores capable of trapping moisture. Other moisture scavengers that may be employed include oxazoladines and calcium oxide.

In one or more embodiments, suitable thixotropic agents may include, but are not limited to, polyvinylpyrrolidone, titanate coupling agents, metal soaps (such as calcium stearate, aluminum stearate, and barium stearate, aluminum distearate, and aluminum tristearate), copolymers with acidic groups, compounds having ionic groups, fumed silica, colloidal silica, asbestine, organic derivatives of castor oil (such as hydrogenated castor oil derivatives), treated clays, organic bentonite, modified polyester polyols (such as poly-oxyethylene-polyoxypropylene block copolymers), aliphatic amides, and polyamides (such as polyamide waxes). Specific examples include polyamide waxes, such as "Crayvallac SLX" available from Arkema, or polymerized castor oils such as Flowtone R from Crayvalley.

Antioxidants that may be employed if desired. Examples of useful antioxidants include hindered phenols and phosphate esters.

Generally, any compatible filler, such as calcium carbonate may be employed if desired for a particular application. As the skilled person will appreciate, fillers will generally be omitted when the adhesive composition is intended to be sprayed onto one surface that is subsequently applied to a second surface on which the adhesive is or is not deposited.

As mentioned above, the adhesive composition may include one or more catalysts for the purpose of promoting the crosslinking the silane-terminated polymer. Without wishing to be bound by any particular theory, it is believed that these catalysts promote the hydrolysis and condensation of organosilicon compounds (i.e., reactions between the terminal groups of the polymer having silicon-containing hydrolyzable terminal groups, and reactions between the optional adhesion promoter when present and the polymer having silicon-containing hydrolyzable terminal groups). In one or more embodiments, hydrolysis of organosilicon compounds may be catalyzed by either acids or bases. Useful basic catalysts that may be employed in the compositions of this invention include alkali metal hydroxides such as potassium hydroxide, silanolates such as lithium silanolate, organic amines, and Lewis bases such as alkali metal carbonates and bicarbonates. Suitable acid catalysts include mineral acids such as sulfuric and phosphoric acids, organic acids such as acetic, propanoic and methane sulfonic acids. Other suitable acid catalysts include Lewis acids such as aluminum chloride, organotin compounds such as dibutyl tin dilaurate and titanium compounds such as the alkyl ortho esters, including tetrabutyl titanate.

In one or more embodiments, the adhesive composition employed in this invention are advantageously devoid or substantially devoid of a solvent. As used herein, the term solvent refers to a volatile liquid that is either a VOC or VOC exemption liquid. Examples of solvents that are excluded include toluene and acetone.

In one or more embodiments, the silicon-containing adhesive compositions used in this invention include at least 25 wt %, in other embodiments at least 30%, and in other embodiments at least 35 wt. % silane-terminated polymer. In these or other embodiments, these adhesive compositions include at most 80%, in other embodiments at most 75%, and in other embodiments at most 70% wt. % silane-terminated polymer. In one or more embodiments, the adhesive compositions of the invention include from about 25% to about 80%, in other embodiments from about 30% to about 75%, and in other embodiments from about 35% to about 70% wt. % silane-terminate polymer.

In one or more embodiments, the silicon-containing adhesive compositions used in this invention include at least 1%, in other embodiments at least 3%, and in other embodiments at least 5% wt. % tackifier resin (e.g., hydrocarbon resin). In these or other embodiments, these adhesive compositions include at most 30%, in other embodiments at most 25%, and in other embodiments at most 20% wt. % tackifier resin (e.g., hydrocarbon resin). In one or more embodiments, these adhesive compositions include from about 1% to about 30%, in other embodiments from about 3% to about 25%, and in other embodiments from about 5% to about 20% wt. % tackifier resin (e.g., hydrocarbon resin).

In one or more embodiments, the silicon-containing adhesive compositions used in this invention include at least 1%, in other embodiments at least 1.5%, and in other embodiments at least 2% wt. % adhesion promoter. In these or other embodiments, these adhesive compositions include at most 10%, in other embodiments at most 9%, and in other embodiments at most 8% wt. % adhesion promoter. In one or more embodiments, these adhesive compositions include from about 1% to about 10%, in other embodiments from about 1.5% to about 9%, and in other embodiments from about 2% to about 8% wt. % adhesion promoter.

In one or more embodiments, the silicon-containing adhesive compositions used in this invention include at least 0.05%, in other embodiments at least 0.1%, and in other embodiments at least 0.15 wt. % catalyst. In these or other embodiments, these adhesive compositions include at most 3%, in other embodiments at most 2.5%, and in other embodiments at most 2% wt. % catalyst. In one or more embodiments, these adhesive compositions include from about 0.05% to about 3%, in other embodiments from about 0.1% to about 2.5%, and in other embodiments from about 0.15% to about 2% wt. % catalyst.

In one or more embodiments, the silicon-containing adhesive compositions used in this invention include at least 0.25%, in other embodiments at least 0.5%, and in other embodiments at least 0.75% wt. % moisture scavenger. In these or other embodiments, these adhesive compositions include at most 5%, in other embodiments at most 4%, and in other embodiments at most 3% wt. % moisture scavenger. In one or more embodiments, these adhesive compositions include from about 0.25% to about 5%, in other embodiments from about 0.5% to about 4%, and in other embodiments from about 0.75% to about 3% wt. % moisture scavenger.

In one or more embodiments, the silicon-containing adhesive compositions used in this invention include at least 5%, in other embodiments at least 10%, and in other embodiments at least 15% wt. % plasticizer. In these or other embodiments, these adhesive compositions include at most 65%, in other embodiments at most 60%, and in other embodiments at most 55% wt. % plasticizer. In one or more embodiments, these adhesive compositions include from about 5% to about 65%, in other embodiments from about 10% to about 60%, and in other embodiments from about 15% to about 55% wt. % plasticizer.

In one or more embodiments, the silicon-containing adhesive compositions used in this invention may advantageously be 100% solids compositions. In one or more embodiments, these compositions may be devoid of solvent. In these or other embodiments, the adhesive compositions are substantially devoid of solvents, which refers to that amount of solvent or less that will not have an appreciable impact on the composition. In one or more embodiments, the compositions of this invention include less than 10%, in other embodiments less than 8%, and in other embodiments less than 5% wt. % solvent.

In one or more embodiments, the tackifier resin may include a phenolic resin. In other embodiments, the adhesive composition is devoid of phenolic resins. In these or other embodiments, the adhesive compositions are substantially devoid of phenolic resin, which refers to that amount of solvent or less that will not have an appreciable impact on the composition. In one or more embodiments, the compositions of this invention include less than 3%, in other embodiments less than 2%, and in other embodiments less than 1% wt. % phenolic resin.

Preparation of Adhesive

The silicon-containing adhesive compositions used in this invention may be prepared by batch mixing using conventional batch mixing equipment. In one or more embodiments, the mixer may be equipped with an emulsifier. The mixing can take place under atmospheric pressure and at room temperature. The ingredients can conveniently be introduced to the mixer by first introducing the silane-terminate polymer followed by introduction of the other ingredients. Mixing may continue until desired viscosity or level of dispersion/solubility is achieved. In particular embodiments, mixing is conducted for at least 100 minutes, in other embodiments at least 150 minutes, in other embodiments at least 180 minutes, and in other embodiments at least 190 minutes.

In one or more embodiments, these adhesive compositions may be formulated as either one-part or two-part compositions. In the case of one-part compositions, the composition is preferably free of water, and contains a moisture scavenger as discussed above. In the case of a two part composition that is combined at the point of use, one part may contain a small amount of water to initiate moisture curing and components that are not sensitive to moisture, whereas the other part may contain components that are sensitive to moisture such as adhesion promoters and more reactive polymers having silicon-containing hydrolyzable terminal groups.

Application of Adhesive

In one or more embodiments, the application of the adhesive composition to the substrate can be performed by completely covering the substrate with the adhesive. In other embodiments, the substrate may be partially covered. In one or more embodiments, the adhesive is applied to the roof substrate in the form of a bead that may be about ¼ to about 1 inch in diameter or thickness. The membrane can then be rolled out or otherwise applied to the substrate, which thereby spreads the adhesive. In one or more embodiments, these beads may be applied in strips at a distance of from about 1 foot to about 3 feed (or even up to 5 feet) in distance from one another. Spacing of strips can be adjusted to achieve various wind uplift ratings.

In one or more embodiments, the membrane panel may be applied to the adhesive layer using several known techniques. For example, the membrane panel may be unrolled on to the adhesive layer.

In one or more embodiments, the roof substrate may include a roof deck. Practice of this invention is not limited by the selection of any particular roof deck. Accordingly, the roofing systems herein can include a variety of roof decks. Exemplary roof decks include concrete pads, steel decks, wood beams, and foamed concrete decks.

In one or more embodiments, the roof substrate may include an insulation board or cover board. Practice of this invention is likewise not limited by the selection of any particular insulation board. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/01099832003/0082365, 2003/0153656, 2003/0032351, and 2002/0013379, as well as U.S. Ser. Nos. 10/640,895, 10/925,654, and 10/632,343, which is incorporated herein by reference.

In other embodiments, these membranes may be employed to cover flat or low-slope roofs following a re-roofing event. In one or more embodiments, the roof substrate in a re-roofing event includes an existing membrane (i.e., reskinning). In other embodiments, the substrate includes a re-cover board. In one or more embodiments, the membranes may be employed for re-roofing as described in U.S. Publication No. 2006/0179749, which are incorporated herein by reference.

In order to demonstrate the practice of the present invention, the following examples have been prepared and tested. The examples should not, however, be viewed as limiting the scope of the invention. The claims will serve to define the invention.

What is claimed is:

1. An adhered roofing system comprising:
   i. a roof substrate;
   ii. a thermoplastic membrane including an upper thermoplastic polymer layer and a lower thermoplastic polymer layer, where the lower layer includes from about 3 to about 50 weight percent of a functionalized thermoplastic polyolefin polymer having a polar group, based upon the entire weight of the lower layer, and where the upper layer is devoid of a functionalized thermoplastic polyolefin polymer; and
   iii. an adhesive securing the membrane to the substrate, where the adhesive includes a cured residue of a polymer having a silicon-containing hydrolyzable terminal group, where the lower layer of the thermoplastic membrane is in direct contact with said adhesive.

2. The roofing system of claim 1, where the adhered roofing system is a fully-adhered roofing system.

3. The roofing system of claim 1, where the functionalized thermoplastic polymer is maleated polypropylene.

4. The roofing system of claim 1, where the functionalized thermoplastic polymer is a maleated propylene-based polymer.

5. The roofing system of claim 1, where the thermoplastic membrane is a two-layered, laminated membrane.

6. The roofing system of claim 1, where the thermoplastic membrane is a multi-layered membrane including two or more coextruded layers.

7. The roofing system of claim 1, where the roof substrate includes an insulation board or a cover board.

8. The roofing system of claim 1, where the roof substrate includes an existing membrane.

9. The roofing system of claim 1, where the lower layer that includes a functionalized polymer includes from about 5 to about 25 weight percent of the functionalized polymer, based upon the entire weight of the layer that includes the functionalized polymer.

10. The roofing system of claim 1, where the lower layer that includes a functionalized polymer includes from about 7 to about 15 weight percent of the functionalized polymer, based upon the entire weight of the layer that includes the functionalized polymer.

11. The roofing system of claim 1, where the functionalized thermoplastic polymer is a maleated polyolefin.

12. The roofing system of claim 1, where the polar group is selected from the group consisting of hydroxyl, carbonyl, ether, ester, halide, amine, imine, nitrile, oxirane, and isocyanate groups.

13. The roofing system of claim 1, where the polar group is selected from carboxylic acid, anhydride, ketone, acid halide, ester, amide, and imide groups, and derivatives thereof.

14. The roofing system of claim 1, where the functionalized thermoplastic polyolefin polymer includes at least 0.2 weight percent of a pendent polar functional group, based upon the total weight of the functionalized thermoplastic polyolefin polymer.

15. The roofing system of claim 1, where the membrane further includes a scrim layer disposed between the upper layer and the lower layer.

16. A method for forming an adhered membrane roof system, the method comprising:
   i. applying a bond adhesive to a substrate on a roof to form an adhesive layer, where the bond adhesive includes a polymer having a silicon-containing hydrolyzable terminal group; and
   ii. applying a thermoplastic membrane directly to the adhesive layer, where the thermoplastic membrane includes an upper thermoplastic polymer layer and a lower thermoplastic polymer layer, where the lower layer includes from about 3 to about 50 weight percent of a functionalized thermoplastic polyolefin polymer having a polar group, based upon the entire weight of the lower layer, where the upper layer is devoid of a functionalized thermoplastic polyolefin polymer, and where the lower layer is in contact with said adhesive layer.

17. The method of claim 16, where the substrate is completely covered with the adhesive.

18. The method of claim 16, where the substrate is partially covered with the adhesive.

19. The method of claim 16, where the adhesive is applied to the roof substrate in the form of a bead that is from about ¼ in to about 1 in. in diameter or thickness.

20. The method of claim 16, where the functionalized thermoplastic polymer is maleated polypropylene.

21. The method of claim 16, where the functionalized thermoplastic polymer is a maleated propylene-based polymer.

22. The method of claim 16, where the lower layer includes from about 5 to about 25 weight percent of the functionalized thermoplastic polyolefin polymer, based upon the entire weight of the lower layer.

* * * * *